United States Patent [19]

Jurgenson

[11] Patent Number: 5,172,286
[45] Date of Patent: Dec. 15, 1992

[54] LOAD BEAM INTERLOCKING BOSS

[75] Inventor: Ryan A. Jurgenson, Hutchinson, Minn.

[73] Assignee: Hutchinson Technology, Inc., Hutchinson, Minn.

[21] Appl. No.: 542,423

[22] Filed: Jun. 22, 1990

Related U.S. Application Data

[63] Continuation-in-part of Ser. No. 460,574, Jan. 3, 1990, abandoned.

[51] Int. Cl.⁵ .......................... G11B 5/48; G11B 21/16
[52] U.S. Cl. .................................................. 360/104
[58] Field of Search ................ 360/104, 103, 105, 107

[56] References Cited

U.S. PATENT DOCUMENTS

| | | | |
|---|---|---|---|
| 3,931,641 | 1/1976 | Watrous | 360/104 |
| 4,107,748 | 8/1978 | Ho | 360/104 |
| 4,167,765 | 9/1979 | Watrous | 360/103 |
| 4,391,035 | 7/1983 | Van de Bult | 29/603 |
| 4,783,710 | 11/1988 | Salyer | 360/104 |
| 4,807,054 | 2/1989 | Sorensen et al. | 360/104 |
| 4,819,094 | 4/1989 | Oberg | 360/104 |
| 4,829,395 | 5/1989 | Coon et al. | 360/104 |
| 4,893,205 | 1/1990 | Hoppe et al. | 360/104 |
| 4,912,583 | 3/1990 | Hinlein | 360/104 |
| 5,003,420 | 3/1991 | Hinlein | 360/104 |

*Primary Examiner*—John H. Wolff
*Attorney, Agent, or Firm*—Faegre & Benson

[57] ABSTRACT

A connection mechanism for connecting a pair of head suspension assemblies to a disc drive actuator arm in which the connection mechanism includes connection portions associated with respective load beams with such connection portions having cooperating, mating bosses extending into a mounting opening in the actuator arm and into interconnecting overlapping engagement with one another to result in an interference fit connection.

11 Claims, 4 Drawing Sheets

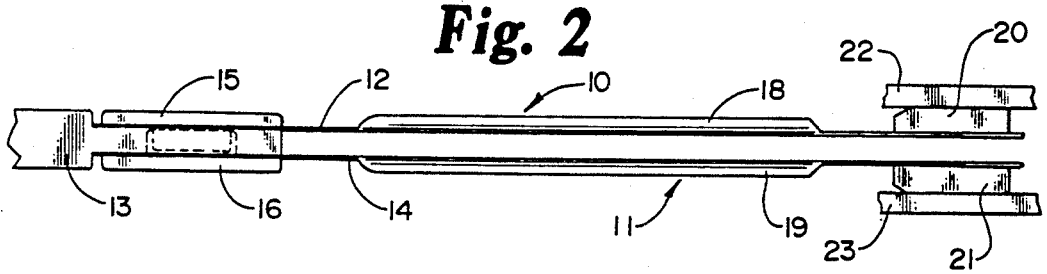
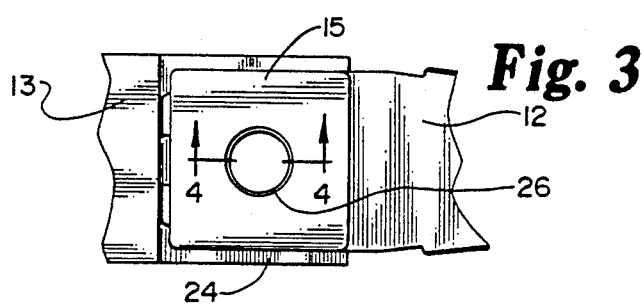
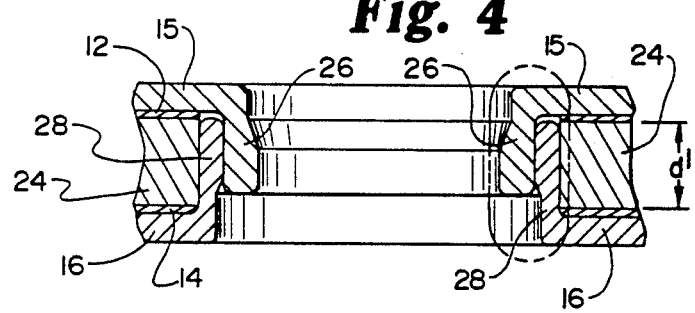
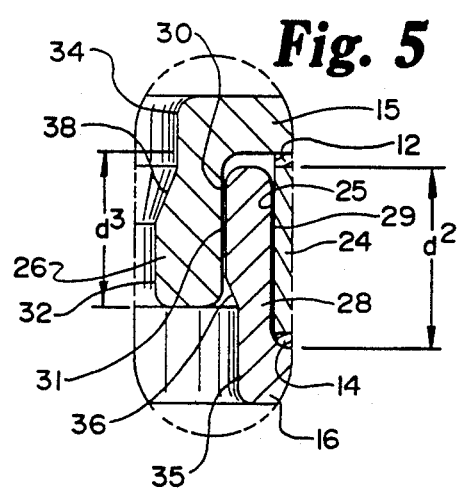

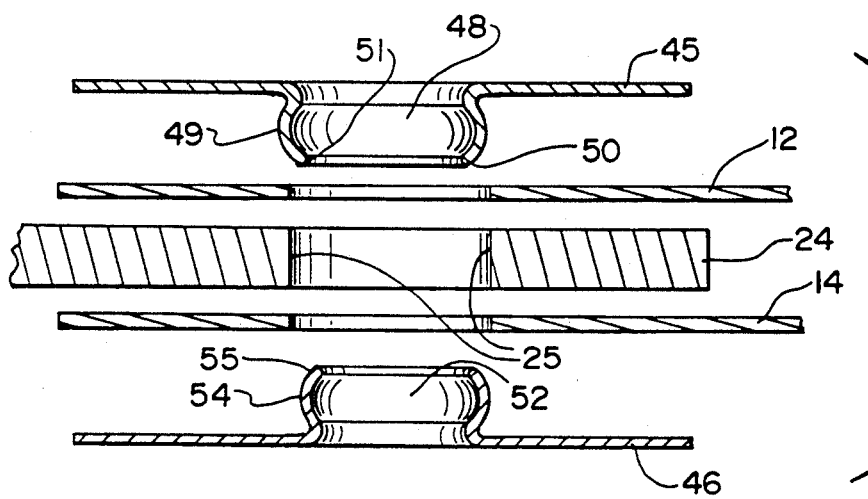
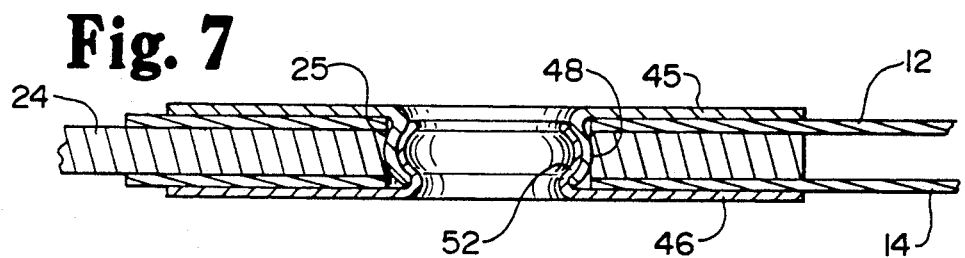
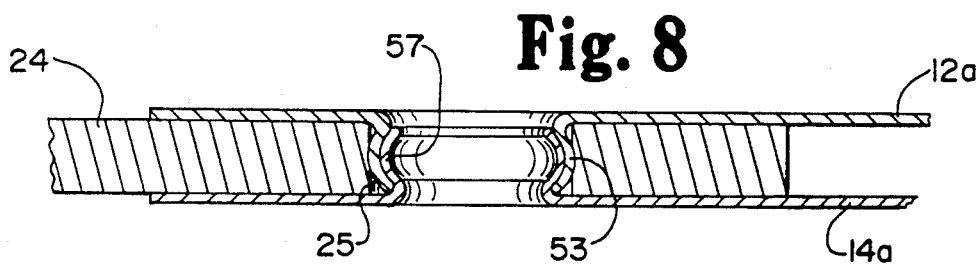
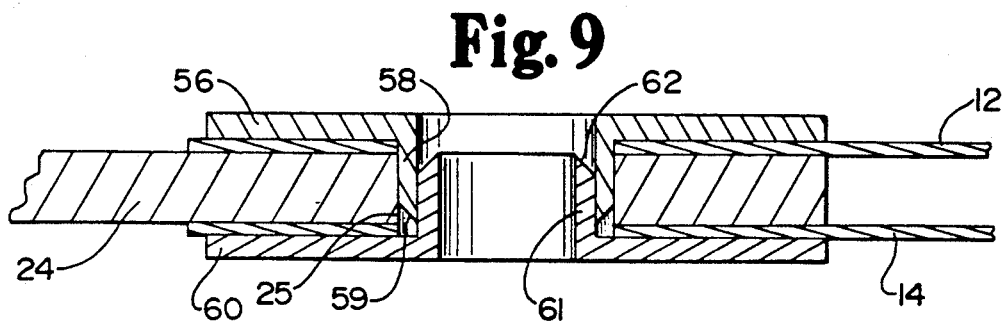

LOAD BEAM INTERLOCKING BOSS

This is a continuation-in-part of application Ser. No. 460,574 filed Jan. 3, 1990, now abandoned.

BACKGROUND OF THE INVENTION

1. Field of the Invention

The present invention relates generally to an improved magnetic head suspension assembly (HSA) and more specifically to a low profile mechanical connection mechanism or assembly for connecting a pair of head suspension assemblies to an actuator arm.

2. Description of the Prior Art

Magnetic head suspension assemblies are used in magnetic disc storage devices or disc drives for the purpose of positioning and supporting a read/write transducer head or slider at one end relative to a rotating disc. A common construction is to have a plurality of such rotating discs which are spaced relative to one another about a common rotational axis. In a multiple disc system, a pair of oppositely disposed head suspension assemblies are positioned between the discs, with one HSA of each pair associated with respective opposing sides of the adjacent discs. The end of the head suspension assembly opposite the slider is connected to a rigid actuator arm. The memory density or memory capacity for a given space and given track density for a multiple disc system is determined principally by the distance between the spaced discs. The closer the discs are spaced, the greater the memory density. Accordingly, there is and has been a need for reducing the disc spacing to thereby result in increased memory capacity.

Currently, a pair of head suspension assemblies are attached to a rigid actuator arm through the use of base plates positioned on opposite sides of the arm. These base plates and the load beams to which they are welded or otherwise connected, are part of the suspension assemblies and are either screwed or swaged to the support arm. In prior art screw connections, small screws extend through holes in the base plates and arm and are retained on the opposite side by a threaded tap in the arm or by a threaded nut plate as disclosed in U.S. Pat. No. 4,912,583 issued to Hinlein on Mar. 27, 1990.

In prior art swage connections, the base plates each include an opening and a generally cylindrical projection or boss designed for extension into a corresponding hole in the actuator arm. A prior art swage connection is disclosed in U.S. Pat. No. 4,829,395 issued to Coon on May 9, 1989. In these prior swage connections, the thickness of the actuator arm must be sufficient to accommodate the bosses of both base plates. Following initial assembly, a steel swaging ball or other means is forced through the openings in the respective bosses thereby deforming the same and causing an interference fit between the outer cylindrical surface of the bosses and the inner cylindrical surface of the opening in the actuator arm. Because of a certain, predetermined minimum length requirements of each of the bosses, the amount that the thickness of the support arm can be reduced is limited. Prior art screw connections have similar actuator arm thickness requirements. Because of these requirements, the amount which the distance between the discs can be reduced is limited. Thus, the memory density of the unit is similarly limited.

Alternative methods of achieving minimum disc spacing, less than that provided by screw or conventional swage connections, are by bonding, welding or otherwise permanently securing the head suspension assemblies directly to the actuator arm. Although this will permit further reduction of the width of the actuator arm, these methods generally require expensive processes and induce a large loss when rework is needed. In the event of a suspension assembly failure, the entire actuator arm must be discarded or a costly HSA removal process must be utilized.

Accordingly, there is a need for an improved head suspension assembly and more particularly, an improved, low profile connection mechanism or assembly by which a pair of head suspension assemblies can be connected to an actuator arm in a manner which reduces or minimizes the thickness of the actuator arm, but which still permits individual HSA's or pairs of HSA's to be easily and inexpensively removed from the actuator arm and replaced.

SUMMARY OF THE INVENTION

The connection mechanism or assembly of the present invention overcomes the limitations of prior art connections by allowing the thickness of the actuator arm and thus the overall connection assembly to be reduced to a point where such thickness is no longer the limiting thickness for determining disc spacing. In so doing, the memory density for a given multiple-disc disc drive can be maximized, resulting in significant improvement over prior swage or screw connections.

The present invention accomplishes the reduction in thickness by utilizing a unique connection assembly incorporating a pair of opposed interlocking bosses having configurations which, when swaged or pressed together, permit the bosses to not only be secured to the actuator arm, but also secured to one another via an interference fit. In this application, the term interference fit is intended to include a connection resulting from frictional forces between two surfaces either via swaging or as a result of the configuration of the connection elements alone. An interference fit is not intended to include a threaded connection.

More specifically, the connection assembly of the present invention includes a pair of opposed, corresponding base plates which are welded or otherwise secured to a pair of load beams in a conventional manner. One of the base plates includes an outer cylindrical boss having an outer cylindrical surface adapted for insertion into and engagement with an opening in the actuator arm. The corresponding second base plate includes an inner cylindrical boss having an outer cylindrical surface adapted for mating engagement with a portion of an inner cylindrical surface of the outer boss. The inner boss of the preferred embodiment is also provided with an inner cylindrical surface adapted for engagement by a swaging ball or tool to secure the respective bosses to one another and the outer boss to the actuator arm by an interference fit. In the preferred embodiment, means are also provided in the respective outer and inner bosses for insuring engagement therebetween after swaging and means in the form of a lead-in surface to facilitate swaging. It is also contemplated, however, that the bosses can be configured to retain the load beams to the arm by the configuration of the bosses alone, without swaging. A further feature of the present invention contemplates incorporating the interlocking elements into the load beams themselves, thus eliminating the need for the base plates.

The result is a connection assembly which permits significant reduction of the thickness of the actuator arm and connection components, while still maintaining sufficient resistance to torque and the ability to remove and replace individual head suspension assemblies without having to discard the entire actuator arm.

A further feature of the present invention includes means to cap the head suspension assemblies at the ends of a stack having one or more intermediate actuator arms and corresponding pairs of head suspension assemblies.

Accordingly, it is an object of the present invention to provide an improved connection assembly for connecting a pair of head suspension assemblies to an actuator arm which does not restrict or limit reductions in disc spacing.

Another object of the present invention is to provide an improved connection assembly for connecting a pair of head suspension assemblies to an actuator arm which permits reduced disc spacing while securing the load assembly to the actuator arm with no significant reduction in torque resistance.

A further object of the present invention is to provide a connection assembly for connecting a pair of head suspension assemblies to an actuator arm which permits reduced disc spacing while retaining the ability to replace one or both of the head suspension assemblies, without destroying or discarding the entire actuator arm or other HSA's.

A still further object of the present invention is to provide an improved disc drive system having multiple discs and an improved connection mechanism for connecting a pair of head suspension assemblies to an actuator arm which allows for minimum disc spacing and thus maximum memory density.

A still further object of the present invention is to provide a magnetic head suspension assembly for a multiple disc system having a stack of head suspension assemblies and means for capping the end suspension assemblies in such stack.

These and other objects of the present invention will become apparent with reference to the drawings, the description of the preferred embodiment and the appended claims.

DESCRIPTION OF THE DRAWINGS

FIG. 2 is a side view of a portion of a disc drive system with portions broken away incorporating a pair of head suspension assemblies and associated connection mechanism of the present invention.

FIG. 3 is a top view of the connection assembly portion of the device illustrated in FIG. 2.

FIG. 4 is a view, partially in section as viewed along the section line 4—4 of FIG. 3.

FIG. 5 is an enlargement, in section, showing the construction details of the interlocking pair of connection bosses.

FIG. 6 is a broken apart view of an alternate connection assembly of the present invention.

FIG. 7 is a side fragmentary view with parts broken away of a disc drive system incorporating the connection assembly of FIG. 6 in assembled form.

FIG. 8 is a side fragmentary view with parts broken away of a further alternate connection assembly.

FIG. 9 is a side fragmentary view with parts broken away of a still further alternate connection assembly.

DESCRIPTION OF THE PREFERRED EMBODIMENT

Figure 1:
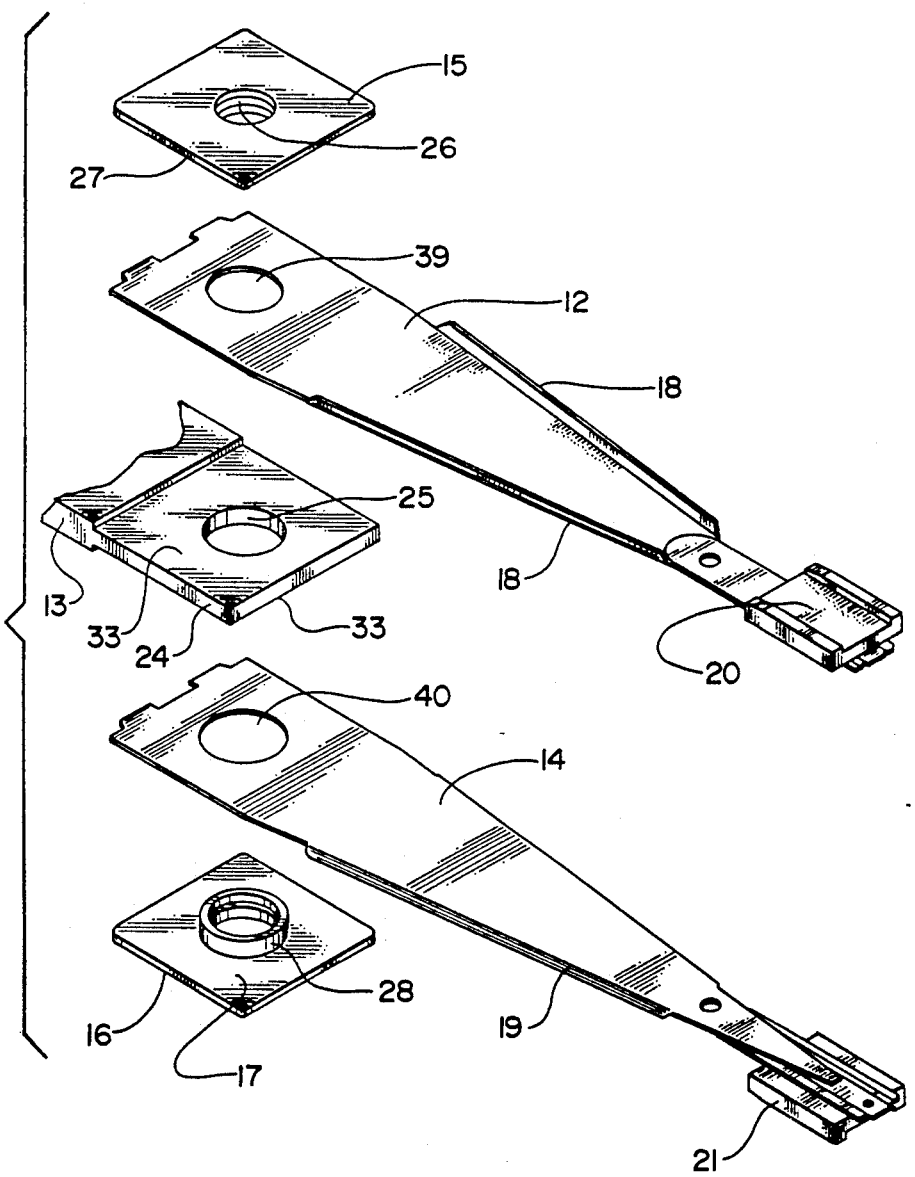
FIG. 1 is a perspective, broken apart view of a pair of head suspension assemblies incorporating the connection assembly of the present invention.

A pair of head suspension assemblies mounted to an actuator arm in a multiple disc drive environment in accordance with the present invention is shown best in FIG. 2. As illustrated, a pair of head suspension assemblies 10 and 11 includes one end connected to a rigid actuator arm 13 and an outer, second end positioned for movement between a pair of spaced discs 22 and 23. In general, the head suspension assembly 10 includes a load beam 12, a base plate or connection member 15 connected to the load beam at one end and a slider or read/write transducer head 20 connected to the load beam 12 at its other end via an appropriate flexure. The head suspension assembly 11 includes the load beam 14, a base plate or connection member 16 connected to the load beam 14 at one end and a slider or read/write transducer head 21 connected to the load beam 14 at the other end via a flexure.

As illustrated best in FIGS. 1 and 2, each of the load beams 12 and 14 comprises a generally flat thin structure having a connection opening 39 and 40, respectively at one end and includes a pair of side rails 18 and 19, respectively, to provide desired rigidity and load support capability to the structure. Both the load beam 12 and the load beam 14 and their respective transducer heads 20 and 21 comprise conventional elements known in the art. Preferably the load beams 12 and 14 are constructed of stainless steel. It should be noted that in the preferred embodiment, the rails 18 and 19 face away from one another in order to accommodate the reduced actuator arm thickness made possible by the connection assembly of the present invention. However, it is contemplated that the rails 18 and 19 could, if desired, face inwardly as well, providing the arm 13 is of sufficient thickness.

Associated with each of the load beams 12 and 14 is a base plate or connector element 15 and 16, respectively. Each base plate 15 and 16 includes a center opening and a mating boss 26 and 28, respectively (FIG. 4). As will be described in greater detail below, the mating bosses 26 and 28 are designed for interconnection with one another as well as interconnection with the actuator arm 13. In the preferred embodiment, the base plates 15 and 16 include generally flat mounting surface portions 27 and 17, respectively. The respective bosses 26 and 28 extend outwardly from the mounting surface portions 27 and 17 at generally right angles. Preferably the base plates 15 and 16 are welded or otherwise secured to their respective load beams 12 and 14 in a manner conventional in the art. When so connected, the boss 26 of the base plate 15 extends through the opening 39, while the boss 28 of the base plate 16 extends through the opening 40.

The actuator arm 13 is connected or formed with a conventional carriage (not shown) and includes a head suspension assembly connecting portion 24. In the preferred embodiment, the connecting portion 24 is reduced in thickness to take advantage of the arm thickness reducing features of the present invention. It is contemplated, however, that the thickness of the entire rigid arm 13 could be reduced to the thickness of the portion 24 if desired. It is contemplated that certain advantages of the connection mechanism of the present invention can also be obtained by not reducing the thickness of the arm 13. The connecting portion 24 is provided with a pair of opposed mounting surfaces 33 and a mounting opening 25 to receive the bosses 26 and 28 from the base plates 15 and 16 as will hereinafter be described. The actuator arm thickness dimension $d^1$ (FIG. 4) is defined by the distance between the opposed mounting surfaces 33. In the preferred embodiment the arm 13 and portion 24 is constructed of magnesium or aluminum or some similar elastically deformable material.

As illustrated best in FIGS. 4 and 5, the base plates 15 and 16 are provided with corresponding mating bosses 26 and 28. More specifically, the base plate 16 includes an outer boss 28 having an outer generally cylindrical arm engaging surface 29 closely approximating and conforming to the configuration and dimensions of the inner cylindrical surface of the mounting opening 25 in the portion 24. Thus, when the boss 28 is inserted into the opening 25, the surface 29 is in close registration with the surface 25. The boss 28 also includes an inner diameter or cylindrical boss engaging surface 30 which is generally parallel to the cylindrical surface 29. In the preferred structure, the boss 28 is also provided with a second inner surface or back bore 35 having a diameter or cross-sectional dimension greater than the diameter of the surface 30. A recess or chamfer portion 36 is provided to join the surfaces 30 and 35. During the swaging procedure in accordance with the preferred embodiment, a portion of the material from the inner boss is caused to flow into the recessed area 36, thus assisting in the connection between the inner 26 and outer 28 bosses. It is contemplated, however, that many of the advantages of the present invention can be realized without the addition of the recess 36 and the inner surface 35. In such a structure, the inner surface 30 would extend throughout the entire height of the boss 28. The height $d^2$ of the outer boss 28 is defined by the distance the boss 28 extends outwardly from the surface mounting portion 17.

The base plate 15 is provided with an inner boss 26 having an outer cylindrical boss engaging surface 31 and an inner cylindrical swaging surface 32 defining a swaging opening. The boss engaging surface 31 is adapted for insertion into and close registration with the inner boss engaging surface 30. Thus, the configuration and cross-sectional dimensions of the surface 31 approximates and conforms substantially with the configuration and dimensions of the inner surface 30. In the preferred embodiment, the outer surface 31 extends past the recessed portion 36 so that as deformation of the boss 26 occurs during the swaging process hereinafter described, a portion of the material from the boss 26 will expand and flow into and interlock with the recessed portion 36. In the event the recess 36 is eliminated, the bosses 26 and 28 are retained with respect to one another solely by the interference fit between them.

The inner cylindrical swaging surface 32 is generally parallel with the surface 31 and is adapted for engagement by a swaging ball or tool via a method known in the art. The boss 26 includes a second inner surface or back bore 34 having a diameter greater than the diameter of the surface 32. A tapered or lead-in swaging surface portion 38 joins the surfaces 34 and 32 to provide a lead-in surface for the swaging ball or tool as hereinafter described. The height $d^3$ of the inner boss 26 is defined by the distance the boss 26 extends outwardly from the surface mounting portion 27.

When assembled in the manner illustrated in FIG. 4, prior to swaging, the outer surface 29 is in close proximity and registration with the inner surface of the mounting opening 25, while the respective boss swaging surfaces 30 and 31 are in close proximity and registration with one another. When so assembled, it can be seen that the thickness $d^1$ of the connecting portion 24 of the arm 13 plus the thickness of the load beams is less than the sum of the heights $(d^2+d^3)$ of the bosses 26 and 28. Thus, when assembled as illustrated, the respective bosses 26 and 28 overlap with one another. Preferably, using standard load beam thicknesses of about 0.003 inch, the sum of the heights $d^2$ and $d^3$ should be approximately two times greater than the arm thickness $d^1$ and preferably at least about 1.1 times greater. Preferably the connector elements 15 and 16 and integrally formed bosses 26 and 28 are constructed of stainless steel, although it is contemplated that they could be made from other materials as well.

The above described connection assembly can be completed by swaging in accordance with a process conventional in the art. This commonly involves physically forcing a swaging ball or swaging tool through the swaging opening defined by the inner swaging surface 32 so that an outward swaging force is exerted on the inner boss 26. This outward force causes the bosses 26 and 28 to deform slightly with respect to one another to form an interference fit therebetween and also causes the boss 28 and portion 24 to deform slightly, thereby resulting in an interference fit between the boss 28 and mounting opening 25 as well. Preferably, the size of the swaging ball or tool or the outward force generated against the inner boss 26 should be such that the deformation of the opening 25 is an elastic deformation. This will enable the bosses and thus the respective load assemblies to be replaced without having to replace the entire actuator arm. During the swaging process, the deformation of the bosses 26 and 28 is generally a permanent or plastic deformation. Although the opening 25 and the bosses 26 and 28 are preferably cylindrical, it is contemplated that other configurations may also be utilized while still achieving the benefits of the present invention.

In addition to a swaging connection between the outer boss 28 and the support arm portion 24 and between the outer boss 28 and the inner boss 26 as described above, it is contemplated that such elements can also be connected and retained relative to one another by a press or interference fit, without swaging. In such a structure, the retaining force results from the frictional forces between the surfaces of the respective components due to the configuration of the components alone, without deformation by a swaging ball or tool. Examples of structures utilizing an interference fit, without swaging, are illustrated in FIGS. 6-9.

FIGS. 6 and 7 illustrate one such embodiment of a connection mechanism for retaining a pair of load beams 12 and 14 to one end of a support arm 24. FIG. 6 is a broken apart view of such a mechanism, while FIG. 7 illustrates such mechanism in its assembled form. The mechanism of FIGS. 6 and 7 includes a first connection member 45 having a generally flat mounting surface similar to the connection member 15 and a hollow interference fit boss 48 extending outwardly from such mounting surface. The boss 48 includes an outward bulge or convex portion near its midpoint, a corresponding concave portion opposite to the convex portion 49, an inwardly extending lead-in edge portion 50 and an outer end edge 51. The preferred embodiment illustrates the boss 48 being hollow throughout, however, only a portion sufficient to receive an inner boss needs to be hollow.

The mechanism of FIG. 6 also includes a second connection member 46 having a flat mounting surface and an inner interference fit boss 52 extending outwardly from such surface. The boss 52 includes a convex portion 54 near the midpoint of the boss 52 and an inwardly inclined lead-in edge 55 near its outer end. To assemble the mechanism of FIGS. 6 and 7, the load beams 12 and 14 are positioned on opposite sides of the support arm 24 as shown, with the connection openings of the load beams 12 and 14 aligned with the support arm opening 25 or the connection members 45 and 46 connected with the load beams 12 and 14 in a manner known in the art. The connection member 45 is then assembled by inserting the outer boss 48 into the opening 25. During this assembly, the lead-in edge 50 engages an edge of the opening 25 to properly align and guide the boss 48 into the opening 25. The connection member 46 is assembled by inserting the inner boss 52 into the hollow interior portion of the boss 48. During this assembly, the lead-in edge of 55 engages the outer edge 51 of the boss 48 to properly align and guide the connection member 46 into proper position. The two connection members 45 and 46 are then manually or otherwise pressed together so that the convex portion 54 of the boss 52 seats within the inner concave portion of the boss 48.

In the assembled position, the convex portion 49 of the boss 48 frictionally engages the side wall of the opening 25 and the inner surface of the boss 48 and the outer surface of the boss 52 frictionally engage one another. In such mechanism, it is essential that the inner ends of the bosses 48 and 52 overlap to some extent with one another to provide the interference fit between such bosses. Also, the dimensions of the bosses 48 and 52 are such that upon insertion, they will frictionally engage via an interference fit, the opening 25 and the inner surface of the boss 48, respectively. It is also preferable for the bosses to have limited flexibility to result in the interference fit.

In the interference fit mechanism of FIGS. 6 and 7 and the swage connection mechanism of FIGS. 4 and 5, it is contemplated that connection members would be utilized to connect the load beams 12 and 14 to the support arm 24. However, it is also contemplated that the inner ends of the load beams themselves can be constructed to incorporate a connection mechanism, thus eliminating the connection members 15 and 16 of FIGS. 4 and 5 and the connection members 45 and 46 of FIGS. 6 and 7. Such mechanism results in significant reduction in the overall thickness of the connection assembly. In FIG. 8, the load beams 12a and 14a positioned on opposite sides of the support arm 24 have been modified to incorporate a connection mechanism directly into the load beams themselves. Specifically, the load beam 12a has been modified to include a hollow outer boss 53 having an outer surface for engagement with the inner surface of the mounting opening 25, while the load beam 14a has been modified to include an inner boss 57 having an outer surface for engagement with the inner surface of the boss 53. The bosses 53 and 57 are similar to the bosses 48 and 52 of FIGS. 6 and 7, except that the bosses 53 and 57 are formed directly in the load beams 12a and 14a. Also, similar to the connection mechanism of FIGS. 6 and 7, the bosses 53 and 57 of FIG. 8 must be sufficiently long to result in at least a partial overlap and must have dimensions facilitating a sufficient frictional engagement with their respective engagement surfaces.

FIG. 9 illustrates a further embodiment of an interference fit connection mechanism. In FIG. 9, the connection members 56 and 60 are similar to the connection members 45 and 46 of FIG. 7, except that the respective bosses 58 and 61 have generally straight edges. The bosses 58 and 61 of FIG. 9 are, however, provided with tapered lead-in edges 59 and 62, respectively to facilitate proper alignment and insertion of the bosses 58 and 61. In the embodiment of FIG. 9, the outer surface of the boss 58 is in frictional engagement with the inner surface of the connection opening 25, while the outer surface of the boss 61 and the inner surface of the boss 58 are in frictional engagement with one another.

Reference is next made to FIGS. 10, 11, 12 and 13 illustrating a carriage 39 for a multiple disc drive. The carriage 39 comprises a plurality or stack of head suspension assemblies 10 and 11 positioned on opposite sides of a plurality of discs and various alternate means for capping the end head suspension assemblies in such stack. As used herein, the term capping refers to the procedure of connecting the end suspension assemblies to their respective end support arms. The carriage 39 in each of FIGS. 10, 11, 12 and 13 is provided with a plurality of actuator or support arms including first and second end support arms 13a and 13c and one or more intermediate support arms 13b. A pair of head suspension assemblies 10 and 11 are connected with each of the intermediate actuator arms 13b in the manner shown in FIGS. 1-5 or 6-9. However, only a single suspension assembly is connected to each of the end support arms 13a and 13c. FIGS. 10-13 show various alternate mechanisms for accomplishing this connection.

Figure 10:
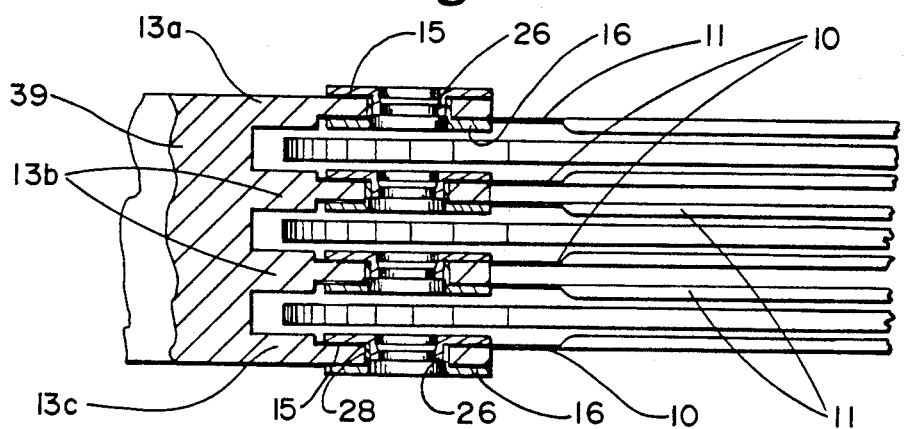
FIGS. 10, 11, 12 and 13 are side fragmentary views with parts broken away of a carriage for a multiple disc drive having a stack of head suspension assemblies and illustrating various alternate embodiments for capping the end head suspension assemblies in such stack.

In FIG. 10, the top assembly 11 is connected to the bottom mounting surface of the arm 13a by using a connection member 15 in combination with the connection member 16 as shown. Such member 15 includes an inner boss 26 which is connected to the corresponding connection member 16 which is in turn connected directly to the support arm 13a. The bottom assembly 10 in FIG. 10 is similarly connected to the top mounting surface of its end support arm 13c by using a connection member 15 in combination with the connection member 16. Thus, both the top and bottom assemblies 11 and 10 in FIG. 10 are capped by use of the connection members 15 and 16, respectively. An advantage of this particular capping mechanism is that the connection members 15 and 16 are the same as are used to connect the assemblies to the intermediate support arms 13b. Thus, no additional parts are required. It does, however, result in some overall increase in carriage height due to the thickness of the members 15 and 16. In each of FIGS. 10-13 where connection members are used it is contemplated that connection can be accomplished by swaging or solely by an interference fit.

Figure 11:
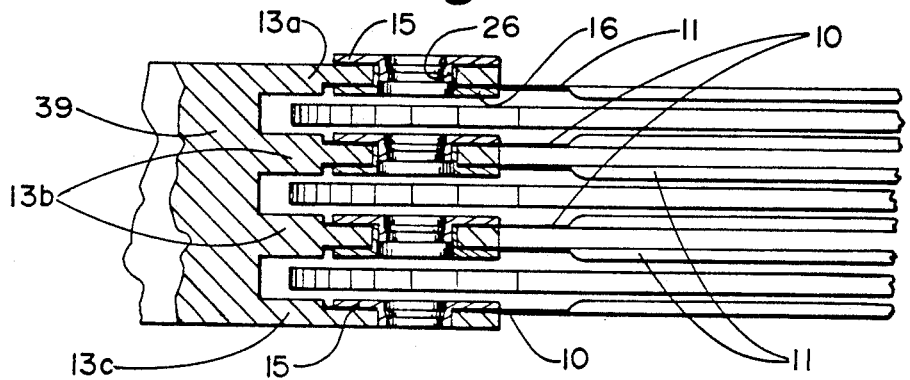

In FIG. 11, the top assembly 11 is connected to the arm 13a in a manner identical to the top assembly 11 in FIG. 10. The bottom assembly 10 in FIG. 11, however, is connected to its support arm 13c by connecting the boss 26 directly to the mounting hole in the arm 13c. Because of this, the mounting opening in the arm 13c must be smaller than the mounting holes in the outer arms 13a and 13b. Although this embodiment results in a decrease in overall carriage height by an amount equal to the thickness of the member 16, it does require a second drill pass if swaging is utilized.

When assembling the carriage 39 illustrated in FIG. 10, an opening is drilled in the actuator arms 13a and 13b to receive the pair of mounting plates 15 and 16. Since these openings are all of the same size, they can be formed with a single drill pass. However, because the connection of the base plate 15 to the actuator arm 13c requires a smaller opening, this must be formed with a second drill pass.

Figure 12:
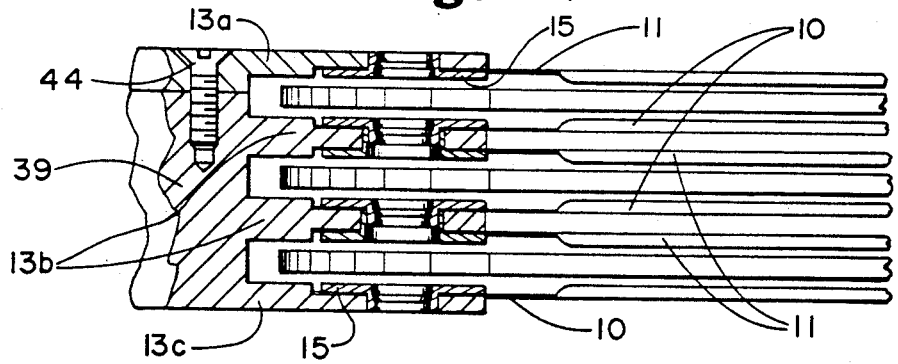

FIG. 12 illustrates a further mechanism for capping the end suspension assemblies. In FIG. 12, both end suspension assemblies are capped off by connecting a base plate member 15 directly to the respective actuator arm 13a and 13c. This results in a decrease in overall carrier height compared to that of both FIGS. 10 and 11. However, because the mounting openings needed in the intermediate actuator arms 13b are larger than the mounting openings needed in the arms 13a and 13c, one of the arms 13a or 13c, must be removable. This allows the larger holes in the arms 13b to be drilled. After this first drilling, the smaller holes in the arms 13a and 13c can be drilled. The assemblies 10 and 11 can then be swaged or otherwise connected to their respective arms 13a, 13b and 13c, followed by connection of the arm 13a to the carriage 39 by the screw 44.

Figure 13:
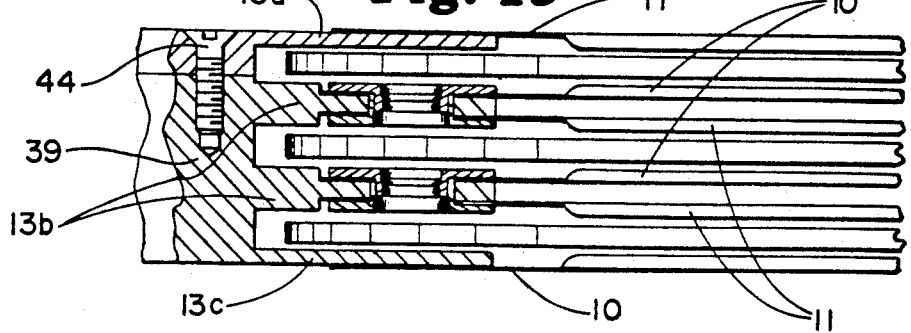

A still further means for capping the head suspension assemblies in a carriage having a stack of such assemblies is by securing the end load beams 11 and 10 directly to their respective actuator arms 13a and 13c by welding, gluing with an adhesive or the like as shown in FIG. 13. When this method is utilized, at least one of the arms 13a and 13c must be removably secured to the carriage 39 or a drill and access hole must be provided in at least one of the arms 13a and 13c. It should be noted that any one of the means of capping the end assemblies shown in FIGS. 10-13 can be utilized, either on one or both ends of the carriage. Further, it is contemplated that any of the swaging connections illustrated in FIGS. 1-5 or any of the interference fit configurations, without swaging, as illustrated in FIGS. 6-9 may be utilized.

The above described connection assembly described in FIGS. 1-5 and 6-9 with respect to support arms 13b and in FIGS. 10-13 with respect to end support arms 13a and 13c permits the support arm thickness, and thus the overall carriage height, to be significantly reduced. This in turn allows the load beams to be placed closer together to accommodate closer disc spacing and increased memory density.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

I claim:

1. A connection assembly for connecting a load beam to an actuator arm in a disc drive comprising:
    a first member having a first hollow cylindrical deformable boss, said first boss sized and adapted for being closely fitted both within a connection opening of a load beam and within a connection opening of an actuator arm from a first side thereof; and
    a second member having a second hollow cylindrical deformable boss, sized and adapted for being closely and securely nest-fitted within the first boss, when the first boss is fitted both within the connection opening of the first load beam and within the connection opening of the actuator arm from a side thereof; whereby, the close nest-fit between the bosses retains the load beam to the actuator arm.

2. A connection assembly according to claim 1, wherein the close nest-fit between the bosses is transformed to an interlocking interference fit by forcing a swaging tool into the second boss and deforming both bosses.

3. A connection assembly according to claim 1, wherein the second boss is further sized and adapted to closely fit both within a connection opening of a second load beam and within the connection opening of the actuator arm.

4. A connection assembly according to claim 3, wherein the close fit between the bosses is transformed into an interlocking interference fit by forcing a swaging tool into the second boss and deforming both bosses.

5. A connection assembly according to claim 1, wherein lead-in surfaces of the bosses are curved to facilitate insertion of a swaging tool.

6. A connection assembly for connecting a load beam to an actuator arm in a disc drive comprising:
    a first member having a first hollow cylindrical deformable boss of a first perpendicular height, sized and adapted for closely fitting both within a connection opening of a load beam and within an actuator arm opening from a proximal side thereof, said actuator arm opening located in a reduced perpendicular height portion of said actuator arm; and
    a second member having a second hollow cylindrical deformable boss of a second perpendicular height, sized and adapted for closely and securely nest-fitting within the first boss, when the first boss is fitted both within the connection opening of the first load beam and within the actuator arm opening from a distal side thereof; whereby the perpendicular height of the reduced height actuator arm portion is less than the sum of the perpendicular heights of the bosses, thereby assuring that the close nest-fit between the bosses securely retains the load beam to the actuator arm.

7. A connection assembly according to claim 6, wherein the bosses are formed with corresponding outward bulges to facilitate an interference fit therebetween.

8. A connection assembly according to claim 6, wherein the close nest-fit between the bosses is reinforced by forcing a swaging tool into the second boss, deforming both bosses into an interference fit.

9. A connection assembly according to claim 6, wherein the second boss is further sized and adapted to closely fit both within a connection opening of a second load beam and within the connection opening of the actuator arm.

10. A connection assembly according to claim 9, wherein the close fit between the bosses is reinforced by forcing a swaging tool into the second boss, deforming both bosses into an interference fit.

11. A connection assembly according to claim 6, wherein lead-in surfaces of the bosses are curved to facilitate entry of a swaging tool.

* * * * *